(12) United States Patent
Dempsey et al.

(10) Patent No.: US 11,236,711 B2
(45) Date of Patent: Feb. 1, 2022

(54) BLUFF BODY COMBUSTION SYSTEM FOR AN INTERNAL COMBUSTION ENGINE

(71) Applicant: Caterpillar Inc., Peoria, IL (US)

(72) Inventors: Adam Dempsey, Metamora, IL (US); Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/019,339

(22) Filed: Sep. 13, 2020

(65) Prior Publication Data

US 2020/0408175 A1    Dec. 31, 2020

Related U.S. Application Data

(62) Division of application No. 15/942,668, filed on Apr. 2, 2018, now abandoned.

(51) Int. Cl.
 *F02M 29/04* (2006.01)
 *B05B 1/26* (2006.01)

(52) U.S. Cl.
 CPC ............ *F02M 29/04* (2013.01); *B05B 1/265* (2013.01); *B05B 1/267* (2013.01)

(58) Field of Classification Search
 CPC . F02M 29/04; F02B 23/0648; F02B 23/0651; B05B 1/26; B05B 1/262; B05B 1/265; B05B 1/267
 See application file for complete search history.

(56) References Cited

U.S. PATENT DOCUMENTS

| | | | | |
|---|---|---|---|---|
| 4,091,731 A * | 5/1978 | Schadow | ................ | F42B 10/40 102/372 |
| 4,206,158 A * | 6/1980 | Wood | ..................... | F02M 9/103 261/62 |
| 5,857,339 A * | 1/1999 | Roquemore | .............. | F23R 3/24 60/749 |
| 6,176,087 B1 * | 1/2001 | Snyder | .................... | F23C 7/002 239/403 |
| 8,950,189 B2 * | 2/2015 | Snyder | .................... | F23R 3/343 60/749 |
| 9,366,432 B2 * | 6/2016 | Mitchell | ................ | F23D 11/441 |
| 9,797,601 B2 * | 10/2017 | Cheung | .................... | F23R 3/286 |
| 10,287,970 B1 * | 5/2019 | Svensson | ............ | F02B 23/0651 |
| 2003/0075121 A1 * | 4/2003 | Dixon | ..................... | F02B 19/06 123/48 A |

(Continued)

*Primary Examiner* — Sizo B Vilakazi
*Assistant Examiner* — Anthony L Bacon
(74) *Attorney, Agent, or Firm* — Hibshman Claim Construction PLLC

(57) ABSTRACT

A combustion system for an internal combustion engine includes a cylinder wall; a cylinder head disposed at an end of the cylinder wall, an internal surface of the cylinder wall and the cylinder head defining a combustion chamber; a fuel injector having a discharge nozzle disposed within the combustion chamber and configured to discharge a fuel jet along a fuel jet axis; and a bluff body disposed within the combustion chamber, the fuel jet axis intersecting an exterior surface of the bluff body. The exterior surface defines a first aperture and a second aperture therethrough, and an interior surface of the bluff body defines a first flow passage extending from the first aperture to the second aperture. The first aperture faces away from the fuel jet axis and the second aperture faces away from the fuel injector along the fuel jet axis.

20 Claims, 12 Drawing Sheets

(56) References Cited

U.S. PATENT DOCUMENTS

| | | | |
|---|---|---|---|
| 2006/0081212 A1* | 4/2006 | Hill | F02B 23/0651 |
| | | | 123/298 |
| 2006/0191269 A1* | 8/2006 | Smith | F23R 3/343 |
| | | | 60/776 |
| 2016/0146464 A1* | 5/2016 | Pasqualotto | F23M 20/005 |
| | | | 60/776 |
| 2017/0350308 A1* | 12/2017 | Polonowski | F02M 67/04 |

* cited by examiner

BLUFF BODY COMBUSTION SYSTEM FOR AN INTERNAL COMBUSTION ENGINE

CROSS-REFERENCE TO RELATED APPLICATIONS

This application is a divisional application of U.S. application Ser. No. 15/942,668, filed on Apr. 2, 2018, the disclosure of which being hereby incorporated by reference in its entirety.

TECHNICAL FIELD

The present disclosure relates to an internal combustion engine, and more particularly, to a combustion system for an internal combustion engine.

BACKGROUND

An internal combustion engine having a direct fuel injection system typically injects a jet of fuel directly into a combustion chamber of the engine. In some cases, these fuel jets may have a core that is rich in fuel, and while the fuel rich core may have insufficient access to an oxidant, for instance, air, the combustion chamber may also provide a sufficiently high temperature to the fuel rich core and hence, aid in the production of soot. Although it may be possible that most of the produced soot may oxidize in the combustion chamber before exhaust is routed out of the combustion chamber, some portion of this soot may continue to exist in its unoxidized state within the combustion chamber.

If left unchecked, this unoxidized soot may, over time, build up in the combustion chamber causing detrimental effects such as sludging of lubricants or other fluids used in the internal combustion engine. Besides, even if the unoxidized soot were expelled from the combustion chamber, it would manifest itself cumulatively as particulate matter that, in turn, is an undesired constituent of engine emissions.

Although some designs of combustion systems are known to help mitigate the formation of soot, for instance, U.S. Pat. No. 6,176,087 that discloses incorporation of a bluff body in gas turbine engines, it will be acknowledged that conditions associated with operation of gas turbine engines are different than those typically experienced during operation of reciprocating internal combustion engines. To that end, manufacturers have been trying to implement better designs of combustion systems in their reciprocating internal combustion engines for minimizing the amount of soot that may be produced during operation of the reciprocating internal combustion engine.

SUMMARY OF THE DISCLOSURE

In an aspect of the present disclosure, a combustion system for an internal combustion engine includes a combustion chamber that is defined between a cylinder head and a top surface of a piston. The combustion system also includes a fuel injector having an injector tip. The injector tip defines a nozzle disposed in fluid communication with the combustion chamber for dispensing a fuel jet into the combustion chamber. A bluff body is positioned within the combustion chamber such that an axis of the dispensed fuel jet is incident on an anterior portion of the bluff body proximal to the injector tip. The anterior portion has a contour that is adapted to split at least a portion of the dispensed fuel jet into at least two turbulent fuel streams and facilitate mixing of each fuel stream with an oxidant present in the combustion chamber.

In a further aspect of the present disclosure, the bluff body may have a posterior portion that defines a first orifice transverse to the axis of the dispensed fuel jet, and a second orifice that is located distal from the injector tip and disposed parallel to the axis of the dispensed fuel jet. The first orifice could be disposed in fluid communication with the second orifice via a passageway such that the first orifice can entrain an oxidant, for instance, air from a portion of the combustion chamber adjacent the first orifice and communicate the entrained oxidant to a portion of the combustion chamber adjacent the second orifice via the passageway. In a further aspect of the present disclosure, a contour of the posterior portion could be convergent or divergent from the axis of the dispensed fuel jet.

In a further aspect of the present disclosure, the contour of the anterior portion could include an apex opposing the flow direction of the fuel jet. Alternatively, the contour of the anterior portion could be convex in a direction opposing a flow direction of the fuel jet. In the foregoing scenario, the contour of the anterior portion would be merely convex, and it should be noted that in such a scenario, the convex contour of the anterior portion does not form an apex. Moreover, in an additional aspect of the present disclosure, where the contour of the anterior portion is merely convex, a maximum perimeter of the anterior portion would be kept at least equal to, or preferably, smaller than a perimeter that is associated with a spray pattern of the dispensed fuel jet incident on the anterior portion.

In a further aspect of the present disclosure, the bluff body could be oblong, spherical, or polyhedral in shape. In addition, where the bluff body is of a polyhedral shape, the bluff body could be configured to define a plurality of concave and convex portions in an alternating arrangement about the axis of the dispensed fuel jet. Moreover, the first orifice may be located on either or both the concave and convex portions of the bluff body.

In another aspect of the present disclosure, the bluff body is also positioned at a pre-determined distance from the nozzle of the injector tip to impart turbulence by generating a wake in the incident fuel jet.

In yet another aspect of the present disclosure, the bluff body may be a screen mesh positioned such that a plane of the screen mesh is angularly disposed to the axis of the dispensed fuel jet. The screen mesh may include wires. Each wire may be disposed at a pre-specified distance from an adjacent one of the wires to render the screen mesh with a pre-determined amount of porosity. Further, each wire may have an oblong, a circular, or a polyhedral cross-section. Furthermore, the screen mesh may be positioned at a pre-determined distance from the nozzle of the injector tip to facilitate at least one wire to impart turbulence by generating a wake in the incident fuel jet.

Alternatively, the screen mesh could be positioned adjacent to the nozzle on the injector tip of the fuel injector. In this configuration, a contour of the screen mesh may be adapted to correspond with a contour of the injector tip. In a further aspect of the present disclosure, a duct may be disposed within the combustion chamber and the screen mesh may be attached to an end of the duct that is distal from the nozzle.

Other features and aspects of this disclosure will be apparent from the following description and the accompanying drawings.

DETAILED DESCRIPTION

Figure 1:
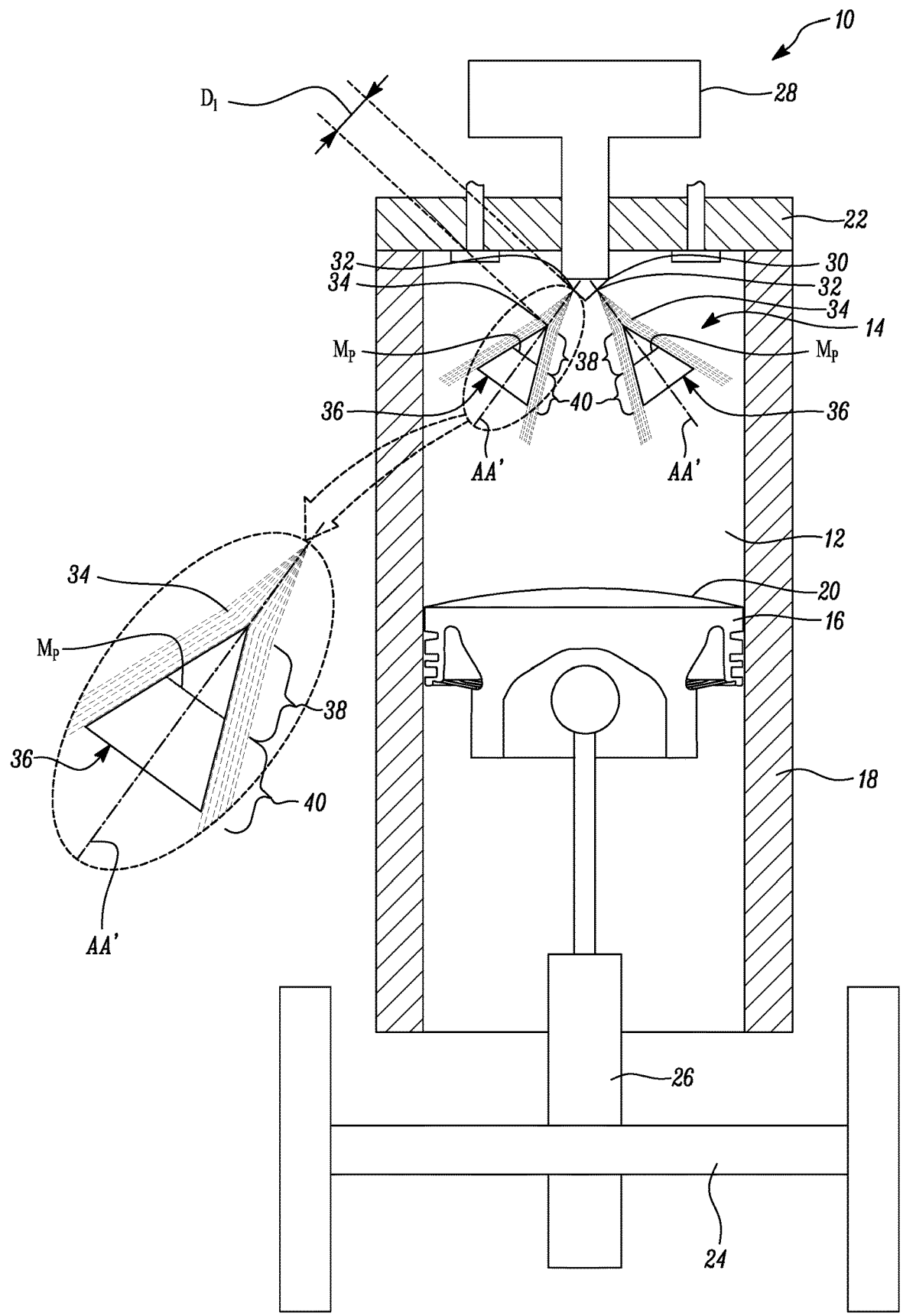
FIG. 1 is a diagrammatic front sectional view of an exemplary internal combustion engine having a combustion chamber and a combustion system having an exemplary bluff body that is associated with the combustion chamber, in accordance with an embodiment of the present disclosure.

Reference numerals appearing in more than one figure indicate the same or corresponding parts in each of them. References to elements in the singular may also be construed to relate to the plural and vice-versa without limiting the scope of the disclosure to the exact number or type of such elements unless set forth explicitly in the appended claims. In the accompanying drawings, FIG. 1 illustrates an exemplary internal combustion engine 10 (hereinafter referred to as 'the engine' and denoted by identical numeral '10') having a combustion chamber 12 and a combustion system 14 associated with the combustion chamber 12, in accordance with an embodiment of the present disclosure. As shown, the engine 10 is embodied as a compression ignition engine, for example, a diesel engine. However, in other embodiments, the engine 10 could be embodied as a spark-ignited engine, for example, a direct-injection gasoline fueled engine, a gas fueled engine with direct-injection of gas, or a dual fuel engine system in which at least one of a pilot fuel and a main fuel are directly injected into a combustion chamber thereof.

Referring to FIG. 1, the engine 10 includes a piston 16 that is slidably disposed within a cylinder 18 such that a top surface 20 of the piston 16 and a cylinder head 22 adjoining the cylinder 18 are in a reciprocally opposing relation to one another for defining the combustion chamber 12 therebetween. Further, the piston 16 is shown connected to a crankshaft 24 of the engine 10 via a connecting rod 26 for converting its linear reciprocal motion within the cylinder 18 into a rotary motion of the crankshaft 24.

Although a single-cylinder engine is used to depict the engine 10, in other embodiments, the engine 10 could include two or more combustion chambers so that the engine 10 be embodied as a multi-cylinder engine. It will be acknowledged that aspects of the present disclosure can be applied similarly in a multi-cylinder engine without deviating from the spirit of the present disclosure.

As shown in FIG. 1, the combustion system 14 also includes a fuel injector 28 having an injector tip 30. The injector tip 30 defines a nozzle 32 that is disposed in fluid communication with the combustion chamber 12 for dispensing a fuel jet 34 into the combustion chamber 12. Further, as shown in FIG. 1, a bluff body 36 is positioned within the combustion chamber 12 such that an axis AA' of the dispensed fuel jet 34 is incident on an anterior portion 38 of the bluff body 36 proximal to the injector tip 30. In embodiments of this disclosure, the bluff body 36 also includes a posterior portion 40 that extends from the anterior portion 38 and is distally located from the injector tip 30.

The anterior portion 38 has a contour that is adapted to split at least a portion of the dispensed fuel jet 34 into at least two turbulent fuel streams and facilitate mixing of each fuel stream with an oxidant (as represented by empty circles in the views of FIGS. 10-12 and 14-15), in the combustion chamber 12. The oxidant may be, for example, air, or particularly, oxygen from the air that may be present in the combustion chamber 12.

In the present disclosure, although the terms 'fuel jet' or 'dispensed fuel jet' has been used, it should be noted that a positioning of the bluff body 36 is not necessarily limited to locations in the combustion chamber 12 where the fuel is merely in a fuel-only phase. Rather, as exemplarily illustrated in the views of FIGS. 2A-2C, the bluff body 36 may be located within the combustion chamber 12 at any position in relation to a flame lift-off length L that is associated with the fuel being dispensed at a pre-specified velocity and pressure. In the exemplary diagrammatic views of FIGS. 2A-2C, the lift-off length L associated with the fuel jet 34 is a length along the fuel jet 34 before which the fuel jet 34 can be regarded as being in its fuel-only phase 27 and after which the fuel jet 34 would ignite into a flame 29.

Figure 2A:
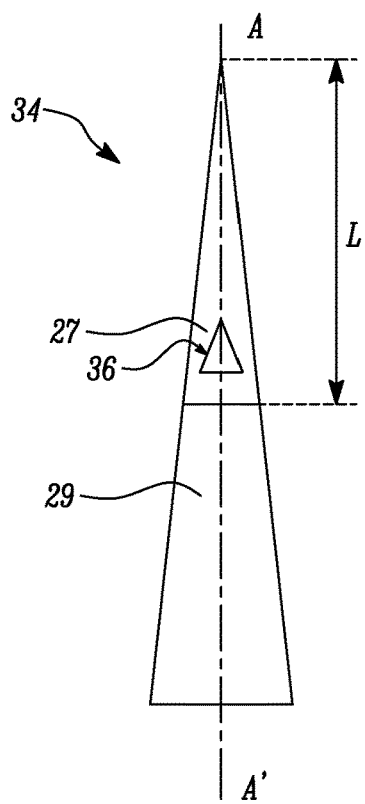
FIGS. 2A-2C illustrate positioning of the exemplary bluff body in relation to a flame lift-off length associated with fuel, according to certain embodiments of the present disclosure.
Figure 2B:
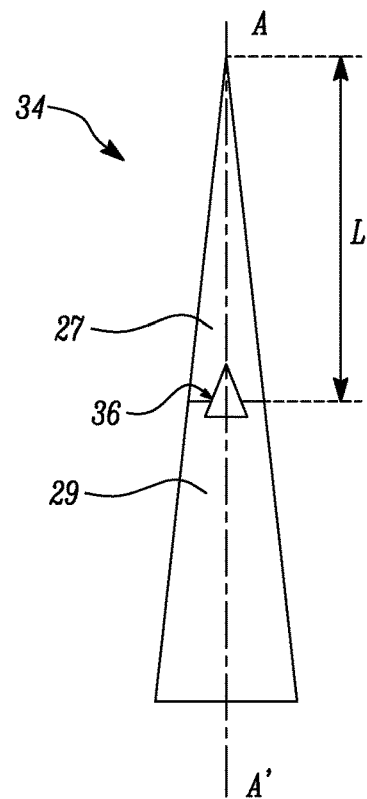
Figure 2C:
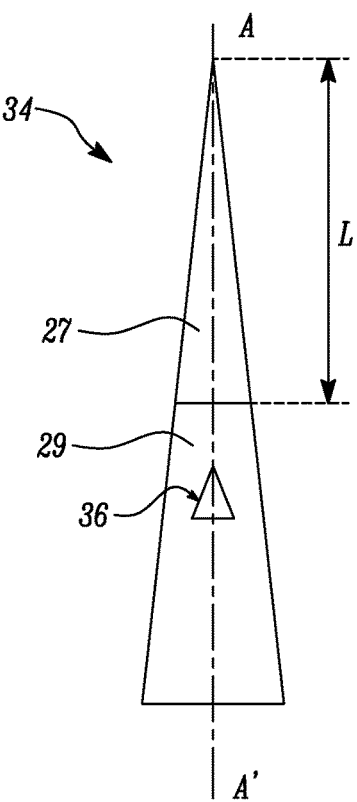

In the exemplary drawing of FIG. 2A, the bluff body 36 is positioned in the path of the fuel jet 34 where the fuel jet 34 is in its fuel-only phase 27. In the exemplary drawing of FIG. 2B, the bluff body 36 is positioned such that at least some portion of the bluff body 36 is disposed along the flame lift-off length L i.e., the bluff body 36 is located partway between the fuel-only zone 27 and the flame zone 29. In the exemplary drawing of FIG. 2C, the bluff body 36 is shown positioned fully in the flame zone 29. Hence, the terms 'fuel jet' or 'dispensed fuel jet' used herein are not only being inclusive of the fuel when the fuel is in its fuel-only phase, rather, it should be understood that such terms are to be construed broadly as they refer to scenarios where the fuel is at least partly, or fully, ignited with a flame along or after the flame lift-off length L.

Figure 3:
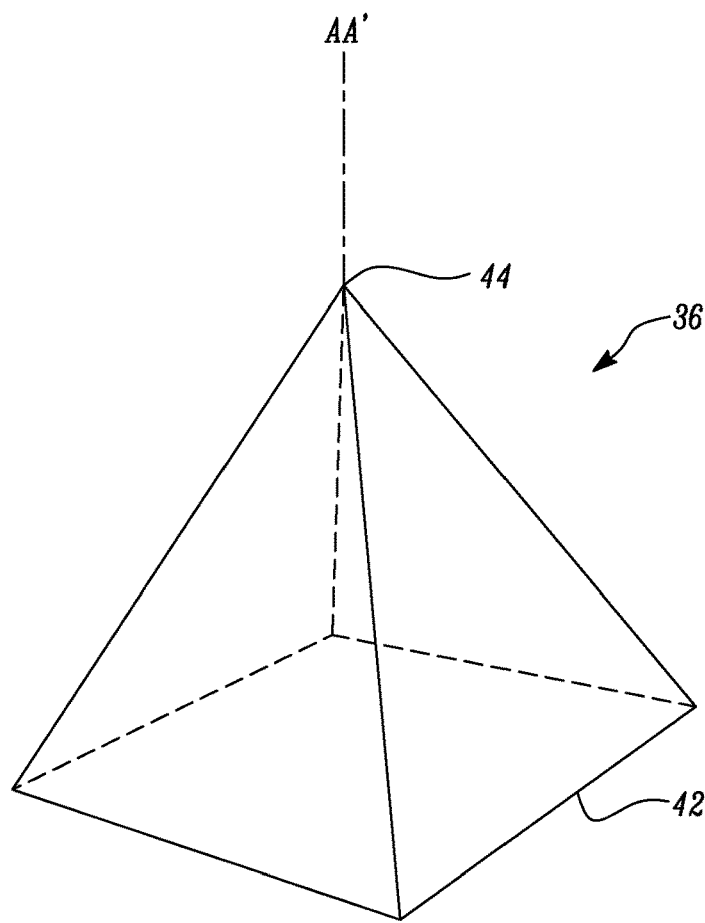
FIGS. 3-8 illustrate a perspective view of exemplary bluff bodies that can be employed for use in the combustion system of FIG. 1, in accordance with embodiments of the present disclosure.
Figure 4:
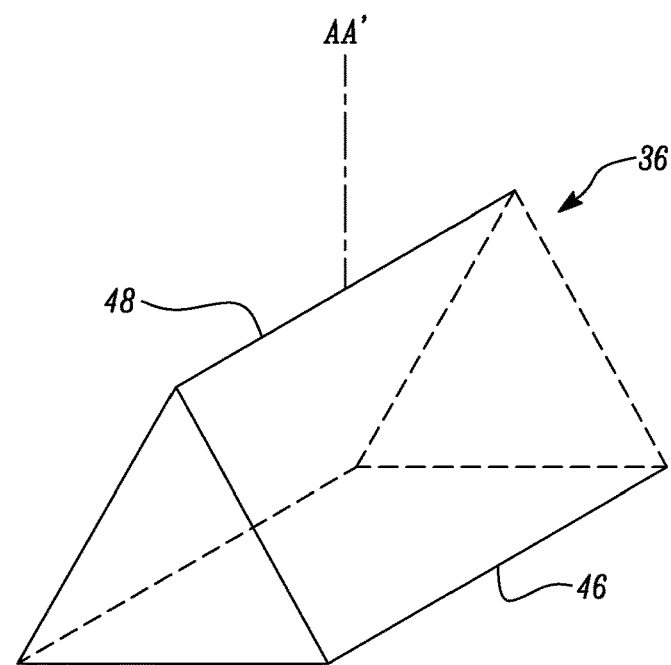

In the illustrated embodiment of FIG. 3, the bluff body 36 is configured to exhibit a pyramidal shape having a square base 42 and an apex 44, or a prismatic shape having a rectangular base 46 and an opposing wedge-shaped end 48 as shown in the illustrated embodiment of FIG. 4.

Although the pyramidal shape of the bluff body 36 is depicted in FIG. 3, it may be noted that the square base 42 of the bluff body 36 is merely exemplary in nature, and hence, non-limiting of this disclosure. Rather, other polygonal shapes can be contemplated in lieu of the square base 42 of the bluff body 36 disclosed in FIG. 3. For example, the bluff body 36 may be configured to exhibit a pentagonal pyramid shape, a hexagonal pyramid shape, or other polyhedral shapes that are known to persons skilled in the art for having either an apex 44 or a wedge-shaped end 48 as shown in the views of FIGS. 3 and 4 respectively.

Figure 5:
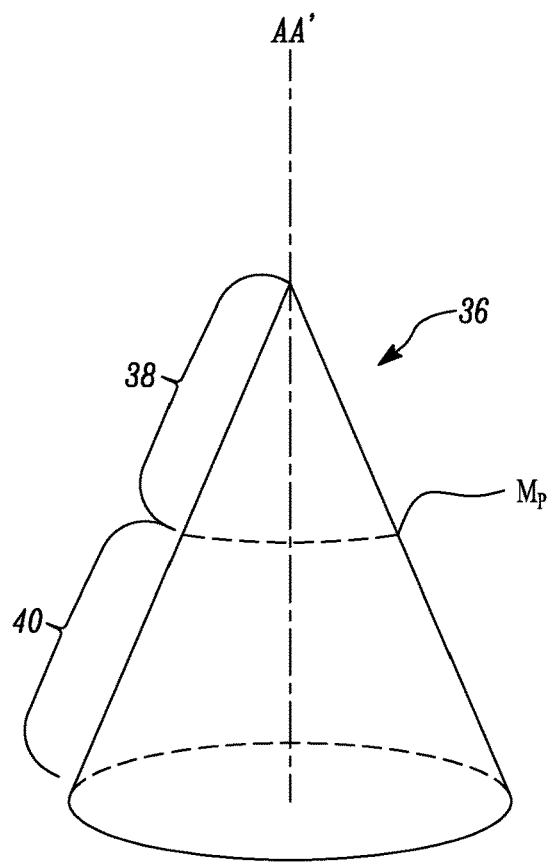
Figure 6:
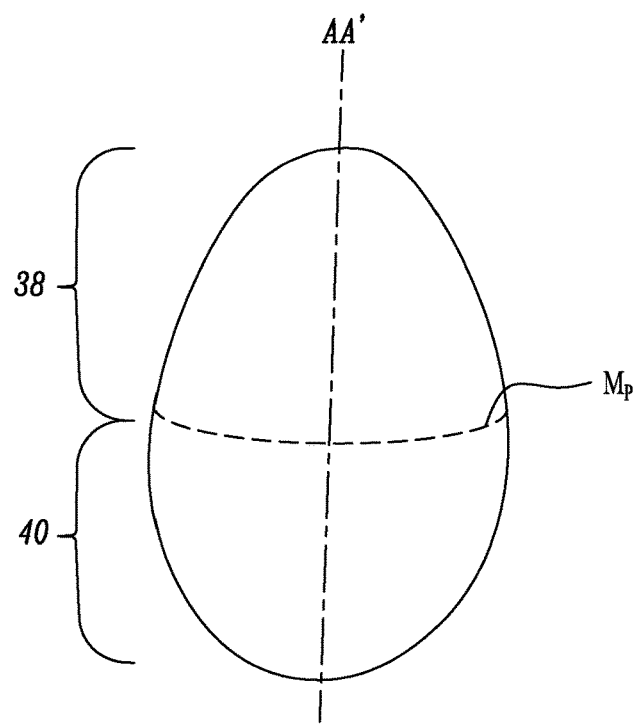
Figure 7:
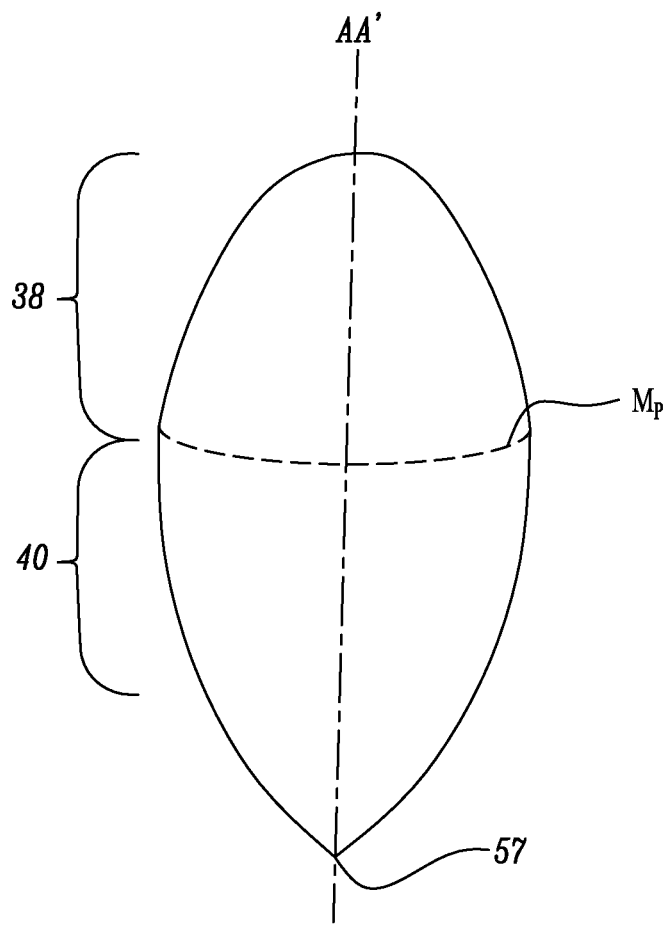
Figure 8:
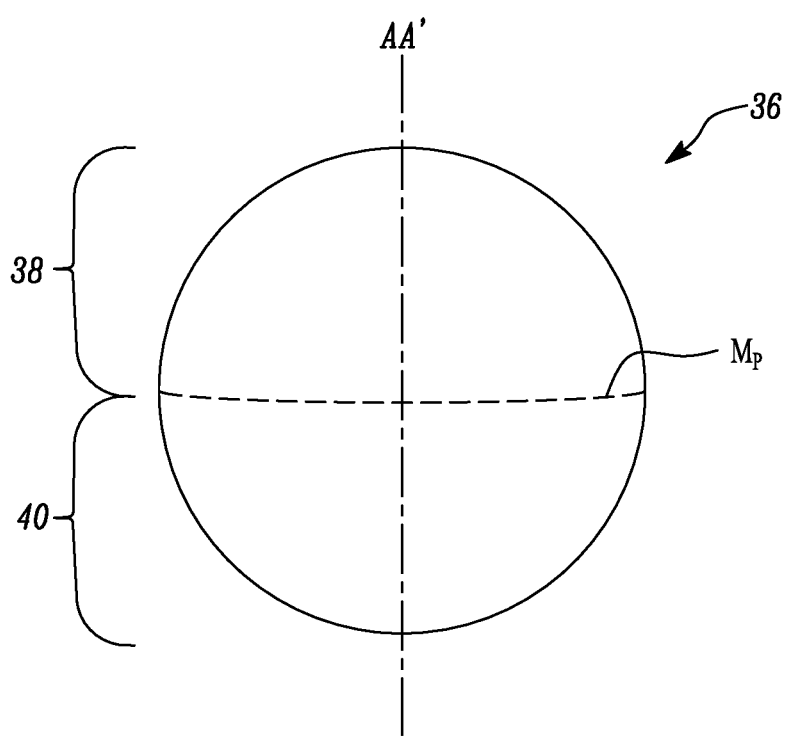

In other embodiments of this disclosure, other shapes such as a conical shape as shown in the view of FIG. 5, an oblong shape as shown in the view of FIG. 6, an oblong shape with a rear apex 57 as shown in the view of FIG. 7, or a spherical shape as shown in the view of FIG. 8 could be used for forming the bluff body 36 disclosed herein. In embodiments of this disclosure, it is hereby contemplated that a shape and material of the bluff body 36 would be selected such that the anterior portion 38 or the posterior portion 40 of the bluff body 36 impede an axial momentum of the dispensed fuel jet 34 as minimally as possible after the fuel jet 34 is incident on the anterior portion 38 of the bluff body 36. Also, as disclosed earlier herein, the contour that would be associated with the anterior portion 38 of the bluff body 36 would be so selected that the anterior portion 38 can split the dispensed fuel jet 34 into two or more turbulent fuel streams.

It is hereby further contemplated that the shape and material of the bluff body 36 are also selected such that the anterior portion 38 or the posterior portion 40 of the bluff body 36 minimally impedes the momentum of the fuel streams that are formed upon splitting the dispensed fuel jet 34. To that effect, in certain embodiments of this disclosure, it is further contemplated that a contour of the posterior portion 40 could also be made convergent towards the axis AA' of the dispensed fuel jet 34 as shown in FIGS. 6, 7 and 8 instead of being divergent from the axis AA' of the dispensed fuel jet 34 as shown in FIGS. 3-5. Due to these aspects, it is envisioned that as the split fuel streams are facilitated to travel with minimal impediment to their momentum, the split fuel streams can now access an increased amount of oxidant within the combustion chamber 12.

In another embodiment as shown in FIGS. 6-8, the contour of the anterior portion 38 could be merely convex in a direction opposing a flow of the fuel jet 34. In such embodiments, it may be noted that although the contour of the anterior portion 38 could be merely convex in a direction opposing a flow of the fuel jet 34, a maximum perimeter $M_p$ of the anterior portion 38 would be kept at least equal to, or preferably, smaller than a perimeter that is associated with a spray pattern of the dispensed fuel jet 34 that would be incident on the anterior portion 38. This way, the anterior portion 38 would not only be configured to offer a separation plane to the dispensed fuel jet 34 for splitting the dispensed fuel jet 34 but would also be configured to reduce the amount of impediment to the axial momentum of the dispensed fuel jet 34 and the split fuel streams that are obtained upon splitting of the dispensed fuel jet 34.

Figure 9:
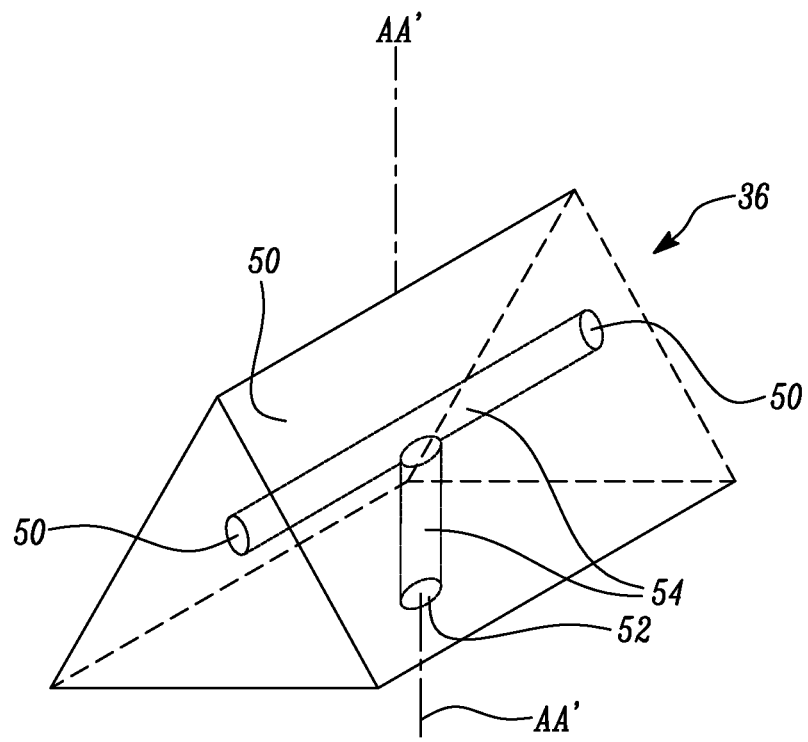
FIG. 9 illustrates a perspective view of another exemplary bluff body having first and second orifices in communication with each other with the help of a passageway, in accordance with an embodiment of the present disclosure.

In a further embodiment as shown in FIG. 9, the posterior portion 40 of the bluff body 36 may be configured to define a first orifice 50 that is transverse to the axis AA' of the dispensed fuel jet 34. In this embodiment, the posterior portion 40 may be further configured to define a second orifice 52 that is disposed parallel to the axis AA' of the dispensed fuel jet 34 and located distally away from the injector tip 30. The first orifice 50 would be disposed in fluid communication with the second orifice 52 via a passageway 54 such that the first orifice 50 can entrain an oxidant, for instance, air from a portion of the combustion chamber 12 adjacent the first orifice 50 and communicate the entrained oxidant to a portion of the combustion chamber 12 adjacent the second orifice 52 via the passageway 54.

It is contemplated that during operation of the engine 10, due to the presence of the bluff body 36, a low-pressure region may exist in the portion of the combustion chamber 12 underlying the posterior portion 40 of the bluff body 36. Moreover, as the fuel jet 34 would be dispensed from the nozzles 32 of the injector tip 30 at a relatively high velocity, this high-velocity fuel would, upon being split at the anterior portion 38 of the bluff body 36, result in two or more fuel streams that would continue as high-velocity fuel streams with a minimal momentum loss.

Figure 10:
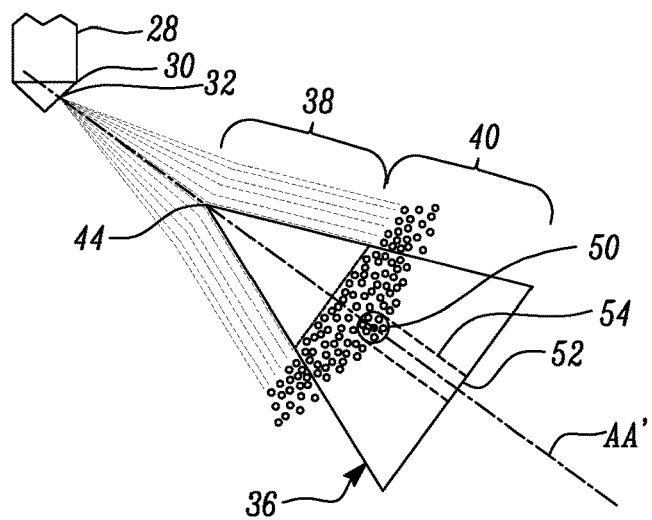
FIGS. 10-12 show states of fuel and oxidant interaction with use of the bluff body from FIG. 9 in the combustion system.
Figure 11:
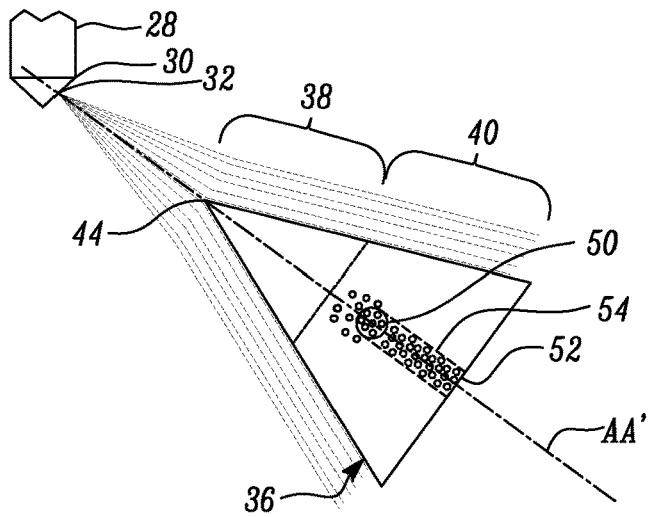
Figure 12:
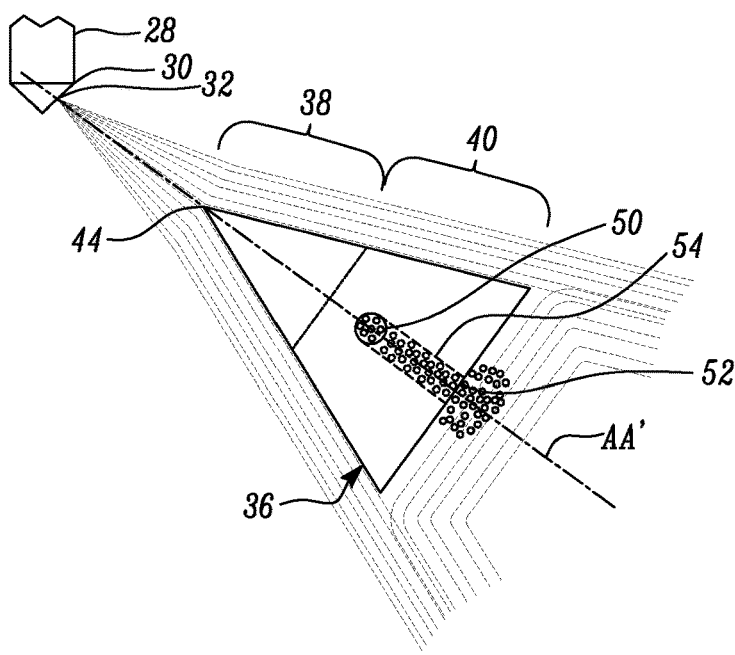

In embodiments of the present disclosure, it is contemplated that the bluff body 36 is positioned at a pre-determined distance $D_1$ from the nozzle 32 of the injector tip 30 to impart turbulence in the split fuel streams by generating a wake in the dispensed fuel jet 34 when the dispensed fuel jet 34 is incident upon the anterior portion 38 of the bluff body 36. As each split fuel stream passes over the bluff body 36, the split fuel streams can tend to push some of the oxidant present in the combustion chamber 12 into the first orifice 50 as shown in FIG. 10. This oxidant may be communicated to the second orifice 52 via the passageway 54 as shown in FIG. 11. As shown in FIG. 12, upon exiting the second orifice 52, the oxidant can now mix with the fuel streams that are in a state of high turbulent mixing at the portion of the combustion chamber 12 adjacent to the second orifice 52.

In this manner, it is envisioned that if a core of the dispensed fuel jet 34 is rich in fuel, such a core would first be split by the anterior region of the bluff body 36 to help the fuel from the core gain access to the oxidant in the combustion chamber 12. Besides, due to the presence of the first and the second orifices 50, 52 being connected by the passageway 54, oxidant from the portion of the combustion chamber 12 adjacent the first orifice 50 could now be pulled by the high velocity split fuel streams adjacent to the bluff body 36 to enter the first orifice 50, and exit the second orifice 52 to efficiently mix with the fuel (that was split from the fuel rich core) at the portion of the combustion chamber 12 adjacent to the second orifice 52.

Figure 13:
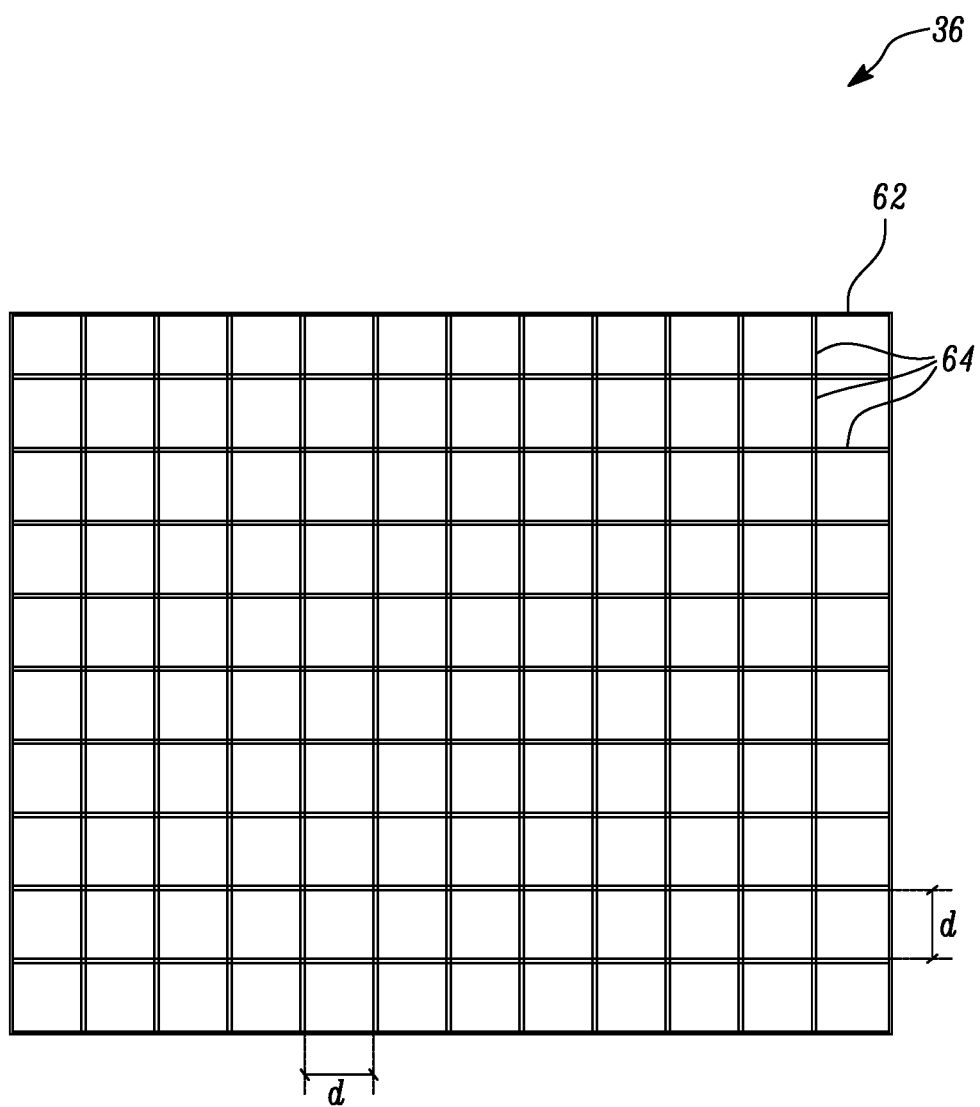
FIG. 13 is a diagrammatic front view of a bluff body that is embodied in the form of a screen mesh having wires, in accordance with another embodiment of the present disclosure.

In an alternative embodiment as shown in FIG. 13, the bluff body 36 may be a screen mesh 62. As shown in FIG. 13, the screen mesh 62 may include wires 64, and each wire 64 may be disposed at a pre-specified distance from an adjacent one of the wires 64 to render the screen mesh 62 with a pre-determined amount of porosity.

Figure 14:
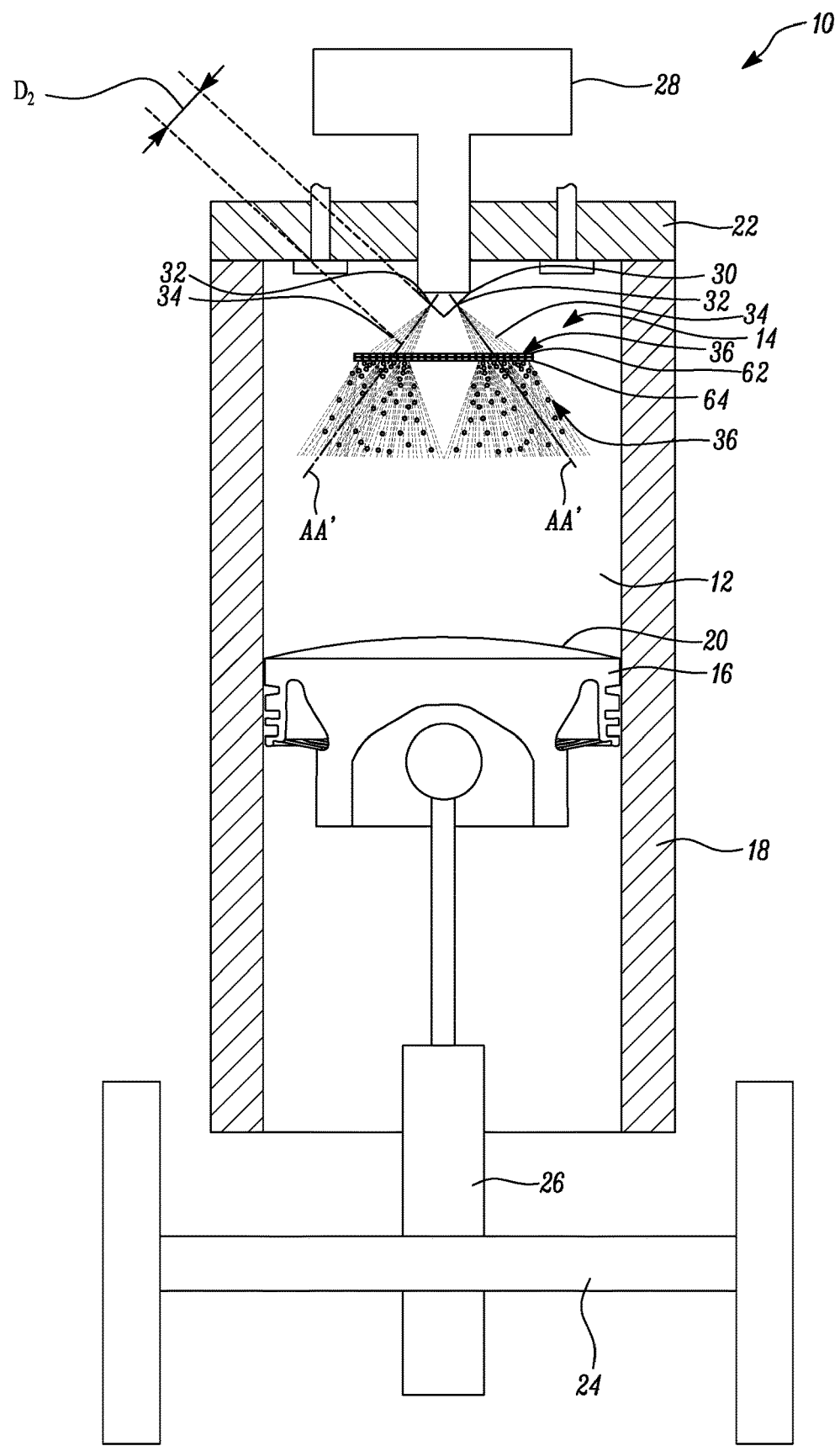
FIG. 14 is a diagrammatic front sectional view of the internal combustion engine showing the combustion system employing the screen mesh of FIG. 13, in accordance with an embodiment of the present disclosure.

The screen mesh 62 could be positioned within the combustion chamber 12 such that a plane of the screen mesh 62 is angularly disposed, for example, at 45 degrees, exactly transverse i.e., at 90 degrees, or 60 degrees to the axis AA' of the dispensed fuel jet 34 as shown in the view of FIG. 14. Further, as shown in the illustrated embodiment of FIG. 14, the screen mesh 62 may be positioned at a pre-determined distance $D_2$ from the nozzle 32 of the injector tip 30 to facilitate at least one wire 64 from the set of wires 64 to impart turbulence by generating a wake in the incident fuel jet 34.

Figure 15:
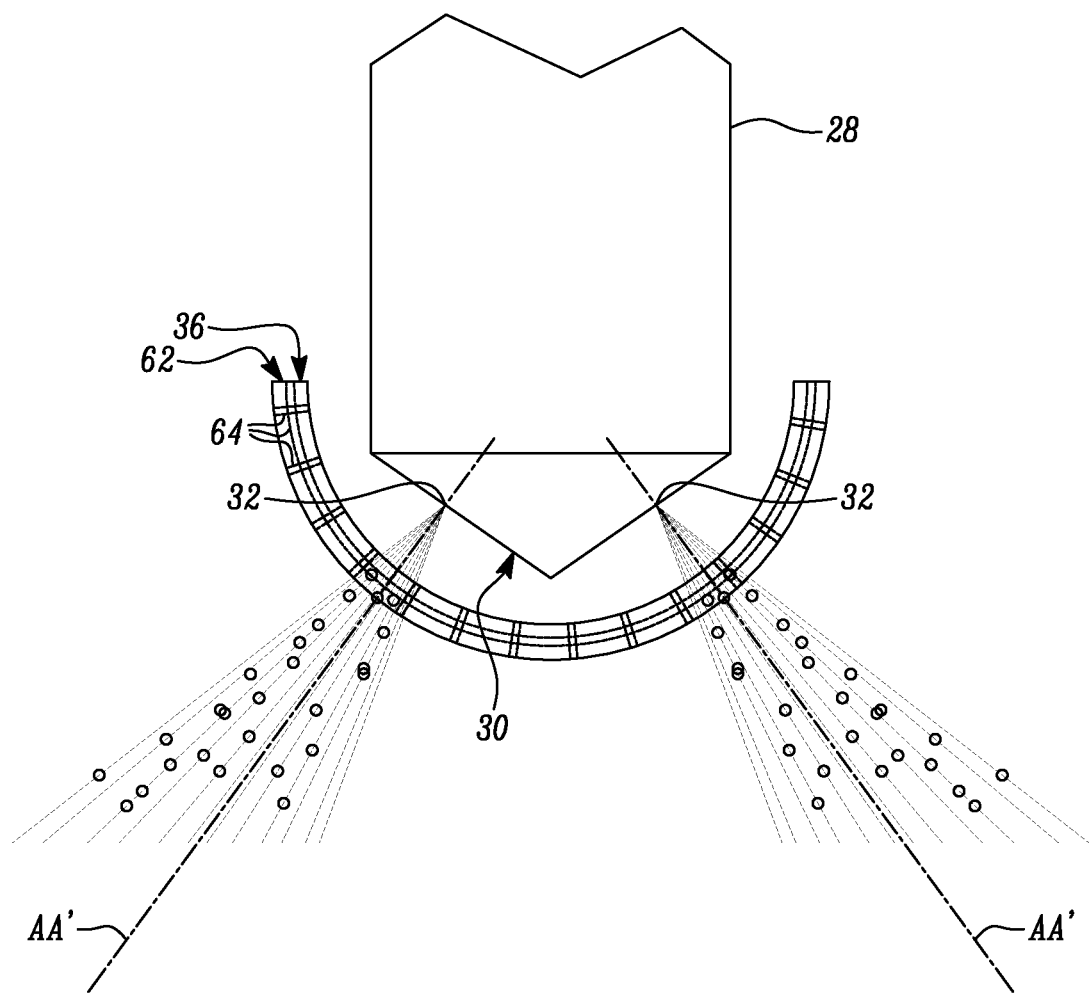
FIG. 15 is a diagrammatic front view of a fuel injector showing a screen mesh adapted to conform with a contour of the injector tip, in accordance with an alternative embodiment of the present disclosure.

Alternatively, in another embodiment as shown in the view of FIG. 15, the screen mesh 62 could be positioned adjacent to the nozzle 32 on the injector tip 30 of the fuel injector 28. In this configuration, a contour of the screen mesh 62 may be adapted to correspond with a contour of the injector tip 30.

Figure 16:
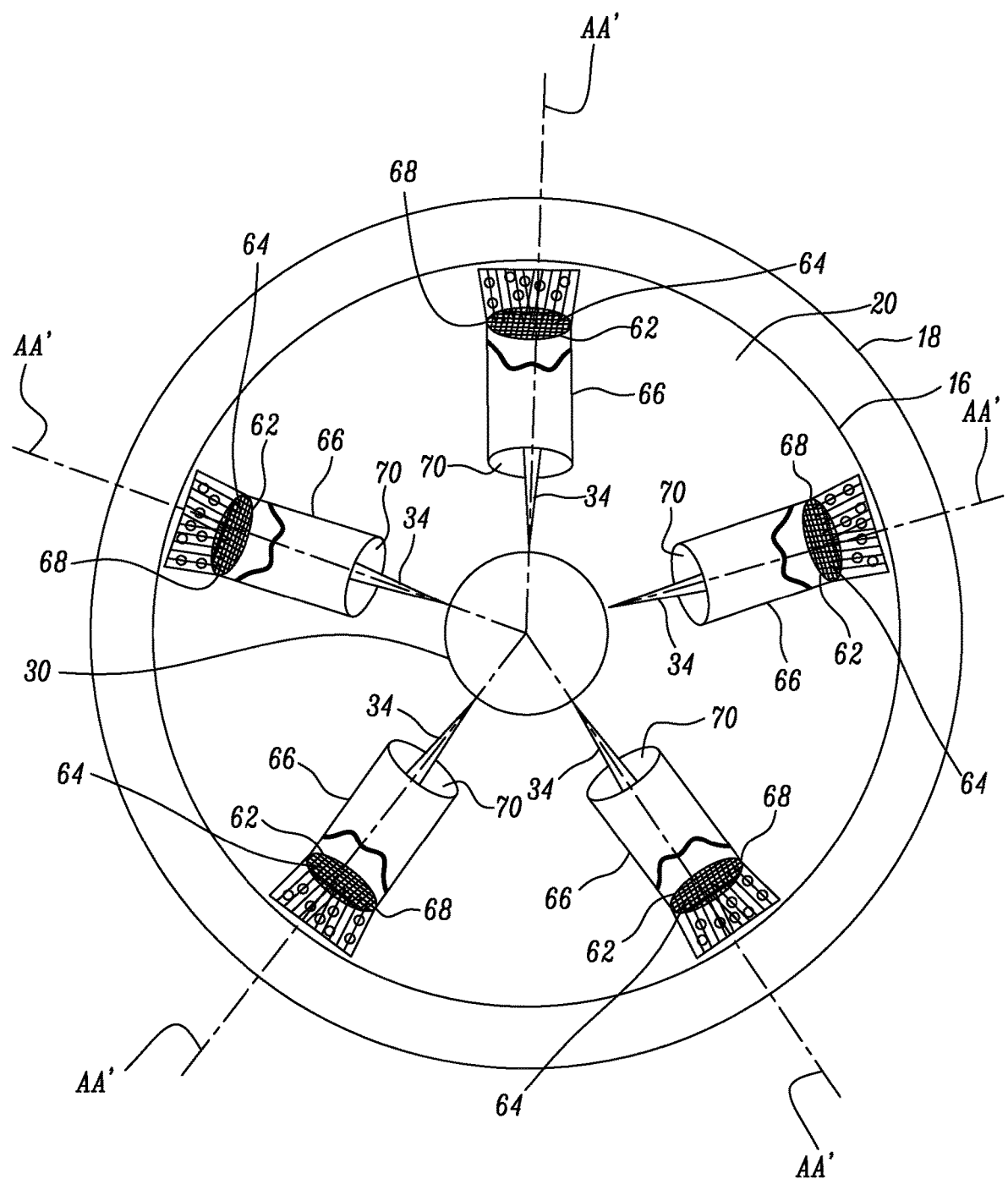
FIG. 16 is a diagrammatic top view of a combustion system showing screen meshes being used in conjunction with ducts, in accordance with yet another alternative embodiment of the present disclosure.

In another embodiment as shown in FIG. 16, a duct 66 may be disposed within the combustion chamber 12 and the screen mesh 62 may be attached to an outlet end 68 of the duct 66 that is distal from the nozzle 32. In this embodiment, when high-velocity fuel is injected through an inlet 70 of the duct 66, it is envisioned that subsequent to a flow of the high-velocity fuel through the duct 66, the duct 66 would entrain air from the combustion chamber 12 and urge the entrained air to follow the high-velocity fuel. The fuel and the entrained air can now be forced into a wake from turbulence created by the wires 64 of the screen mesh 62 at the outlet end 68 of the duct 66, thereby facilitating a more uniform mixing of the fuel and air with one another.

Figure 17:
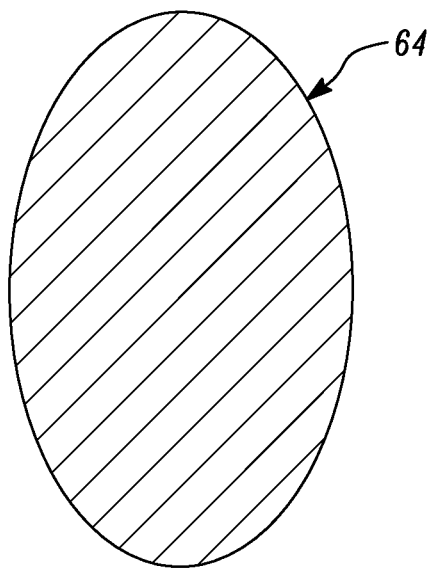
FIGS. 17-19 illustrate different exemplary cross-sections of a wire that can be used either by itself as a bluff body, or to form the screen mesh of FIG. 13, in accordance with embodiments of the present disclosure.
Figure 18:
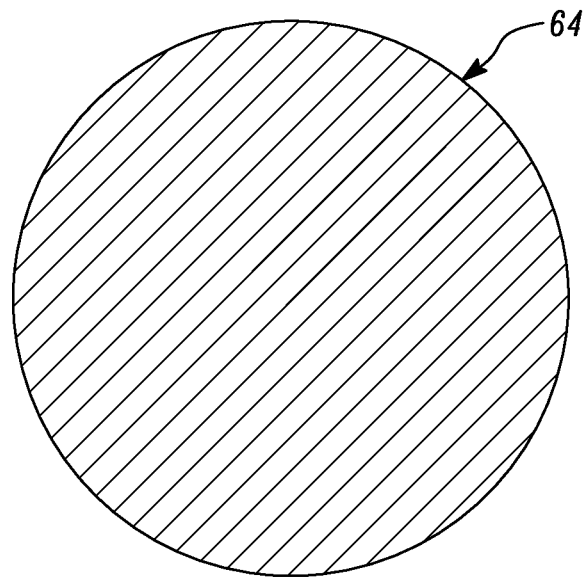
Figure 19:
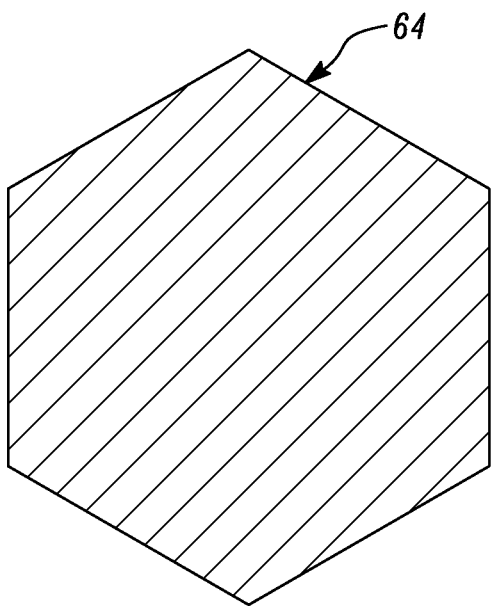

Although one possible configuration of the bluff body 36 has been disclosed in the embodiment in which the bluff body 36 has been explained as being embodied as a screen mesh 62, it will be acknowledged that references made to the screen mesh 62 in totality is non-limiting of this disclosure. Rather, it will be appreciated by persons skilled in the art that each wire 64 that is present on the screen mesh 62 could also be regarded as an individual bluff body 36 by itself as each wire 64 from the screen mesh 62 can be used to perform functions that are consistent with the present disclosure. Therefore, for purposes of the present disclosure, it has been contemplated that in embodiments herein, a wire 64 having an oblong cross-section as shown in the view of FIG. 17, a circular cross-section as shown in the view of FIG. 18, or a polygonal cross-section, for example, a hexagonal cross-section as shown in the view of FIG. 19 can be regarded as the bluff body 36, or multiple wires 64 of an oblong, circular, or polygonal cross-section may be grouped or meshed to define interstitial spaces between adjacently located wires 64 to define the bluff body 36 of the present disclosure.

Various embodiments disclosed herein are to be taken in the illustrative and explanatory sense and should in no way be construed as limiting of the present disclosure. All joinder references (e.g., associated, provided, disposed, in communication and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to or over another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure has applicability for use and implementation in reducing soot emissions with combustion of fuel in an engine. The present disclosure is directed to an internal combustion engine 10 and more particularly, to a combustion system 14 for an internal combustion engine that is configured to help reduce an amount of soot that would otherwise typically be produced without the use of embodiments disclosed herein.

With use of the embodiments herein, fuel jets having a rich fuel core are oxidized by helping the rich fuel core to gain access to oxidants from within the combustion chamber of the engine. As these fuel jets and their fuel rich cores are split with use of the bluff body 36, the split fuel jets can be oxidized for accomplishing combustion with reduced soot emissions.

Moreover, by providing the first and second orifices 50, 52 together with the passageway 54, a pressure within the combustion chamber 12 may be normalized to help entrain the oxidant within the first orifice 50 and direct the entrained oxidant towards the second orifice 52 to mix with the split fuel streams, thereby facilitating a greater amount of oxidation and assisting in the reduction of the amount of soot from combustion. Due to this, detrimental effects caused by soot such as sludging of lubricants, or other fluids in an internal combustion engine can be reduced.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

The invention claimed is:

1. A combustion system for an internal combustion engine, the combustion system comprising:
    a cylinder wall;
    a cylinder head disposed at an end of the cylinder wall, an internal surface of the cylinder wall and the cylinder head defining a combustion chamber;
    a fuel injector having an injector tip defining a fuel discharge nozzle, the fuel discharge nozzle being disposed within the combustion chamber, the fuel discharge nozzle being configured to discharge a fuel jet along a fuel jet axis; and
    a bluff body disposed within the combustion chamber and spaced apart from the fuel injector, the fuel jet axis intersecting an anterior portion of an exterior surface of the bluff body,
    the exterior surface defining a first aperture and a second aperture therethrough,
    an interior surface of the bluff body defining a first flow passage extending from the first aperture to the second aperture, the first flow passage being in fluid communication with the combustion chamber via each of the first aperture and the second aperture, the first flow passage being oriented transverse to the fuel jet axis.

2. The combustion system of claim 1, wherein the exterior surface further defines a third aperture therethrough, and the internal surface defines a second flow passage extending from the third aperture to the first flow passage,
  the first flow passage being in fluid communication with the combustion chamber via the second flow passage and the third aperture.

3. The combustion system of claim 2, wherein the third aperture is located on a posterior portion of the exterior surface, the third aperture facing away from the fuel injector along the fuel jet axis.

4. The combustion system of claim 3, wherein the second flow passage is arranged transverse to the first flow passage.

5. The combustion system of claim 3, wherein the bluff body has a prismatic shape,
  the posterior portion of the exterior surface is rectangular, and
  the exterior surface tapers from the posterior portion to an apex at the anterior portion.

6. The combustion system of claim 5, wherein the exterior surface further includes a first plane and a second plane, the apex being defined by an intersection of the first plane and the second plane,
  the first plane extends from a first edge of the posterior portion to the apex,
  the second plane extends from a second edge of the posterior portion to the apex, and
  the first edge of the posterior portion is disposed opposite the second edge of the posterior portion.

7. The combustion system of claim 6, wherein the exterior surface further includes a first triangular portion and a second triangular portion,
  the first triangular portion extends from a third edge of the posterior portion to the apex,
  the second triangular portion extends from a fourth edge of the posterior portion to the apex, and
  the third edge of the posterior portion is disposed opposite the fourth edge of the posterior portion.

8. The combustion system of claim 7, wherein the first triangular portion defines the first aperture and the second triangular portion defines the second aperture.

9. An internal combustion engine, comprising:
  a cylinder wall;
  a piston disposed within the cylinder wall and disposed in sliding engagement with an internal surface of the cylinder wall;
  a cylinder head disposed at an end of the cylinder wall and facing the piston, the internal surface of the cylinder wall, the piston, and the cylinder head defining a combustion chamber;
  a fuel injector having an injector tip defining a fuel discharge nozzle, the fuel discharge nozzle being disposed within the combustion chamber, the fuel discharge nozzle being configured to discharge a fuel jet along a fuel jet axis; and
  a bluff body disposed within the combustion chamber and spaced apart from the fuel injector, the fuel jet axis intersecting an anterior portion of an exterior surface of the bluff body,
  the exterior surface defining a first aperture and a second aperture therethrough,
  an interior surface of the bluff body defining a first flow passage extending from the first aperture to the second aperture, the first flow passage being in fluid communication with the combustion chamber via each of the first aperture and the second aperture, the first flow passage being oriented transverse to the fuel jet axis.

10. The internal combustion engine of claim 9, wherein the exterior surface further defines a third aperture therethrough, and the internal surface defines a second flow passage extending from the third aperture to the first flow passage,
  the first flow passage being in fluid communication with the combustion chamber via the second flow passage and the third aperture.

11. The internal combustion engine of claim 10, wherein the third aperture is located on a posterior portion of the exterior surface, the third aperture facing away from the fuel injector along the fuel jet axis.

12. The internal combustion engine of claim 11, wherein the second flow passage is arranged transverse to the first flow passage.

13. The internal combustion engine of claim 11, wherein the bluff body has a prismatic shape,
  the posterior portion of the exterior surface is rectangular, and
  the exterior surface tapers from the posterior portion to an apex at the anterior portion.

14. The internal combustion engine of claim 13, wherein the exterior surface further includes a first plane and a second plane, the apex being defined by an intersection of the first plane and the second plane,
  the first plane extends from a first edge of the posterior portion to the apex,
  the second plane extends from a second edge of the posterior portion to the apex, and
  the first edge of the posterior portion is disposed opposite the second edge of the posterior portion.

15. The internal combustion engine of claim 14, wherein the exterior surface further includes a first triangular portion and a second triangular portion,
  the first triangular portion extends from a third edge of the posterior portion to the apex,
  the second triangular portion extends from a fourth edge of the posterior portion to the apex,
  the third edge of the posterior portion is disposed opposite the fourth edge of the posterior portion, and
  the first triangular portion defines the first aperture and the second triangular portion defines the second aperture.

16. A combustion system for an internal combustion engine, the combustion system comprising:
  a cylinder wall;
  a cylinder head disposed at an end of the cylinder wall, an internal surface of the cylinder wall and the cylinder head defining a combustion chamber;
  a fuel injector having an injector tip defining a fuel discharge nozzle, the fuel discharge nozzle being disposed within the combustion chamber, the fuel discharge nozzle being configured to discharge a fuel jet along a fuel jet axis; and
  a bluff body disposed within the combustion chamber and spaced apart from the fuel injector, the fuel jet axis intersecting an anterior portion of an exterior surface of the bluff body,
  the exterior surface defining a first aperture and a second aperture therethrough,
  the first aperture facing away from the fuel jet axis along a transverse direction, the transverse direction being transverse to the fuel jet axis,
  the second aperture facing away from the fuel injector along the fuel jet axis,
  an interior surface of the bluff body defining a first flow passage extending from the first aperture to the second aperture, the first flow passage being in fluid communication with the combustion chamber via each of the first aperture and the second aperture.

17. The combustion system of claim 16, wherein the exterior surface further defines a third aperture therethrough, and the internal surface defines a second flow passage extending from the third aperture to the first flow passage,
- the first flow passage is in fluid communication with the combustion chamber via the second flow passage and the third aperture, and
- the third aperture faces away from the fuel jet axis.

18. The combustion system of claim 17, wherein the second aperture is located on a posterior portion of the exterior surface,
- the bluff body has a prismatic shape,
- the posterior portion of the exterior surface is rectangular, and
- the exterior surface tapers from the posterior portion to an apex at the anterior portion.

19. The combustion system of claim 18, wherein the exterior surface further includes a first plane and a second plane, the apex being defined by an intersection of the first plane and the second plane,
- the first plane extends from a first edge of the posterior portion to the apex,
- the second plane extends from a second edge of the posterior portion to the apex, and
- the first edge of the posterior portion is disposed opposite the second edge of the posterior portion.

20. The combustion system of claim 19, wherein the exterior surface further includes a first triangular portion and a second triangular portion,
- the first triangular portion extends from a third edge of the posterior portion to the apex,
- the second triangular portion extends from a fourth edge of the posterior portion to the apex,
- the third edge of the posterior portion is disposed opposite the fourth edge of the posterior portion, and
- the first triangular portion defines the first aperture and the second triangular portion defines the third aperture.

* * * * *